(12) United States Patent
Marocchini et al.

(10) Patent No.: US 9,605,953 B2
(45) Date of Patent: Mar. 28, 2017

(54) LINKAGE ASSEMBLY FOR SENSOR ASSEMBLY AND METHOD OF DETECTING ANGULAR POSITION OF A TARGET THROUGH MULTIPLE STRUCTURES

(71) Applicant: Hamilton Sundstrand Corporation, Windsor Locks, CT (US)

(72) Inventors: Francis P. Marocchini, Somers, CT (US); Gregory DiVincenzo, Wethersfield, CT (US); Mike R. Lyon, South Windsor, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 48 days.

(21) Appl. No.: 14/528,515

(22) Filed: Oct. 30, 2014

(65) Prior Publication Data
US 2016/0123732 A1    May 5, 2016

(51) Int. Cl.
*G01B 21/00*    (2006.01)
*G01B 21/22*    (2006.01)
(Continued)

(52) U.S. Cl.
CPC ............. *G01B 21/22* (2013.01); *F01D 17/02* (2013.01); *F01D 21/003* (2013.01); *G01M 15/14* (2013.01)

(58) Field of Classification Search
CPC ....... G01B 21/22; F01D 17/02; F01D 21/003; G01M 15/14
(Continued)

(56) References Cited

U.S. PATENT DOCUMENTS 5,185,996 A    2/1993 Smith
5,727,327 A    3/1998 Wakabayashi
(Continued)

FOREIGN PATENT DOCUMENTS

DE    2643607 B1    9/1977
EP    2574733 A2    4/2013
(Continued)

OTHER PUBLICATIONS

Search Report regarding related GB App. No. GB1515374.5; dated Feb. 29, 2016; 3 pgs.
(Continued)

*Primary Examiner* — Yaritza Guadalupe-McCall
(74) *Attorney, Agent, or Firm* — Cantor Colburn LLP

(57) ABSTRACT

A sensor assembly includes a first structure and a second structure disposed radially outwardly of the first structure. Also included is a sensor body extending through the first and second structures, the sensor body having first and second ends, the second end disposed in an ambient environment. Further included is a first sealing assembly configured to couple the sensor body to the second structure and to accommodate movement of the sensor body due to relative movement between the first and second structures. Yet further included is an interior cavity defined by an interior wall of the sensor body and a rotary position sensor mounted to the sensor body proximate the second end of the sensor body, the rotary position sensor configured to detect an angular position of a target disposed within the first environment, the rotary position sensor coupled to the target with a sensor linkage assembly.

15 Claims, 4 Drawing Sheets

(51) Int. Cl.
*F01D 17/02* (2006.01)
*G01M 15/14* (2006.01)
*F01D 21/00* (2006.01)

(58) Field of Classification Search
USPC .......................................................... 33/1 PT
See application file for complete search history.

(56) References Cited

U.S. PATENT DOCUMENTS

| | | | |
|---|---|---|---|
| 6,468,033 | B1 | 10/2002 | Weidlich |
| 6,964,517 | B2 | 11/2005 | Welker |
| 7,153,023 | B2 | 12/2006 | Howard |
| 7,207,769 | B2 | 4/2007 | Tanioka |
| 7,231,817 | B2 | 6/2007 | Smed |
| 8,196,934 | B2 | 6/2012 | Do |
| 8,197,187 | B2 | 6/2012 | Walker |
| 8,439,630 | B2 | 5/2013 | Lemieux |
| 8,573,078 | B2 | 11/2013 | Sue |
| 9,200,538 | B2 | 12/2015 | Walker |
| 2008/0187436 | A1 | 8/2008 | Leogrande |
| 2012/0125131 | A1 | 5/2012 | Sue et al. |
| 2013/0167392 | A1 | 7/2013 | Boyer |
| 2015/0361821 | A1* | 12/2015 | Gould ................... F01D 17/162 415/150 |
| 2015/0369642 | A1 | 12/2015 | Cox |
| 2016/0010492 | A1 | 1/2016 | Cavagnaro |
| 2016/0076868 | A1 | 3/2016 | Feuillard |
| 2016/0123729 | A1* | 5/2016 | Marocchini ............ G01B 21/22 73/112.01 |
| 2016/0123730 | A1* | 5/2016 | Marocchini ............ G01B 21/22 33/1 PT |
| 2016/0123731 | A1* | 5/2016 | Marocchini ............ G01B 21/22 73/112.01 |
| 2016/0123732 | A1* | 5/2016 | Marocchini ............ G01B 21/22 33/1 PT |
| 2016/0123843 | A1* | 5/2016 | Marocchini ............ G01M 15/14 73/112.01 |
| 2016/0123844 | A1 | 5/2016 | Di Vincenzo |

FOREIGN PATENT DOCUMENTS

| | | |
|---|---|---|
| EP | 2966268 A1 | 1/2016 |
| GB | 2216268 A | 4/1989 |
| JP | H01167615 A | 7/1989 |
| JP | H0743134 A | 2/1995 |
| JP | 2000088600 A | 3/2000 |
| WO | 2015050658 A1 | 4/2015 |

OTHER PUBLICATIONS

Search Report regarding related GB App. No. GB1515304.2; dated Apr. 1, 2016; 5 pgs.
Search Report regarding related GB App. No. GB1515373.7; dated Apr. 1, 2016; 5 pgs.
Search Report regarding related GB App. No. GB1515375.2; dated Apr. 1, 2016; 5 pgs.
Search Report regarding related GB App. No. GB1515379.4; dated Apr. 1, 2016; 5 pgs.

* cited by examiner

LINKAGE ASSEMBLY FOR SENSOR ASSEMBLY AND METHOD OF DETECTING ANGULAR POSITION OF A TARGET THROUGH MULTIPLE STRUCTURES

FEDERAL RESEARCH STATEMENT

The invention disclosed herein was made with Government support under Contract No. N00014-09-D-0821 with the United States Navy. The Government may have certain rights in the subject matter disclosed herein.

BACKGROUND OF THE INVENTION

The embodiments herein generally relate to sensor assemblies and, more particularly, to a sensor assembly extending through a plurality of structures which separate distinct operating environments for detecting angular position of a target with a rotary sensor coupled to the target via a linkage assembly, as well as a method of detecting angular position of the target through multiple structures.

Adjustable guide vanes within compressor sections of a turbine engine are known and are able to be monitored with sensing equipment. Sensing equipment in a turbine section of a gas turbine engine poses more challenges due to a high temperature and pressure environment therein. Typically, a hot gas path of a turbine section is surrounded by multiple layers of structures that are subjected to distinct thermal growth cycles due to the distinct environments defined by each structure. Challenges with sensing include operating in extreme hot pressurized environments and bringing the signal out to the outer surface of the engine through multiple engine sections. The distinct thermal growth rates noted above are combined with tolerance stacking of the various hardware pieces.

BRIEF DESCRIPTION OF THE INVENTION

According to one embodiment, a sensor assembly includes a first structure defining a first interior volume having a first environment with a first temperature and a first pressure. Also included is a second structure disposed radially outwardly of the first structure and defining a second interior volume having a second environment with a second temperature and a second pressure each lower than the first temperature and the first pressure. Further included is a sensor body extending through a first aperture of the first structure and a second aperture of the second structure, the sensor body having a first end and a second end, the first end disposed within the first environment and the second end disposed in an ambient environment located radially outwardly of the second structure, wherein the ambient environment has an ambient temperature and an ambient pressure each lower than the second temperature and the second pressure. Yet further included is a first sealing assembly configured to operatively couple the sensor body to the second structure and to accommodate movement of the sensor body due to relative movement between the first structure and the second structure. Also included is an interior cavity defined by an interior wall of the sensor body. Further included is a rotary position sensor mounted to the sensor body proximate the second end of the sensor body, the rotary position sensor configured to detect an angular position of a target disposed within the first environment, the rotary position sensor operatively coupled to the target with a sensor linkage assembly located within the interior cavity of the sensor body.

According to another embodiment, a method of detecting angular position of a target through multiple structures separating multiple distinct environments. The method includes penetrating a plurality of structures with a sensor body, a first end of the sensor body being disposed within a first interior volume having a first environment with a first temperature and a first pressure, a second end of the sensor body being disposed in an ambient environment having an ambient temperature and an ambient pressure each lower than the first temperature and the first pressure, the second end having a sensor mounted thereto. The method also includes operatively coupling the sensor body to at least one of the plurality of structures with a sealing assembly that is configured to accommodate relative movement between the plurality of structures. The method further includes operatively coupling a sensor located proximate the first end of the sensor body to the target located within the first interior volume with a sensor linkage assembly extending through an interior cavity of the sensor body.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Figure 1:
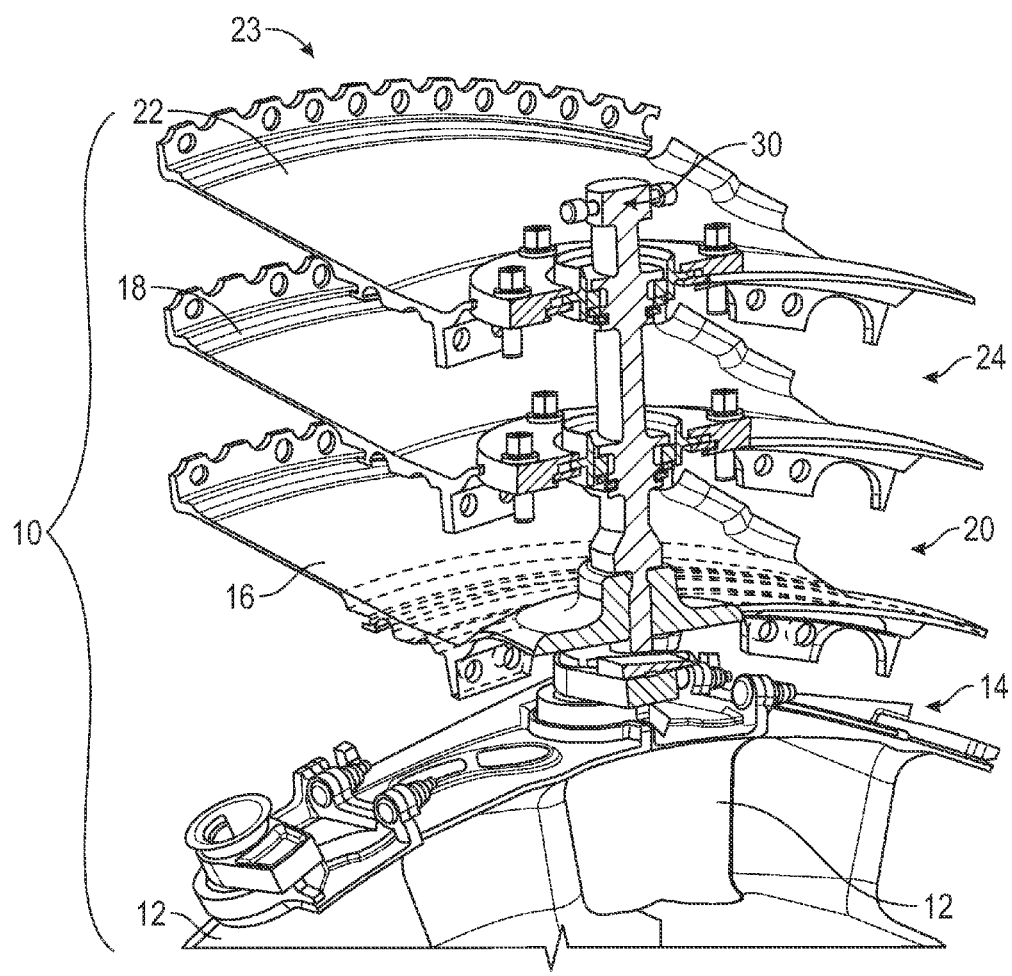
FIG. 1 is a perspective view of a portion of a turbine section having a plurality of structures separating a plurality of volumes having distinct operating environments.

Referring to FIG. 1, a portion of a turbine section is illustrated and generally referenced with numeral 10. In an exemplary embodiment, the turbine section 10 is part of an aircraft engine, such as a high pressure turbine or a low pressure turbine. Illustrated is a portion of a single stage of the turbine section 10. Included is a plurality of adjustable vanes 12, such as adjustable stator vanes and which may be referred to herein interchangeably, that are configured to rotate in a controllable manner. The number of vanes within a single stage may vary depending upon the application. In one embodiment, the number of stator vanes varies from about 20 vanes to about 40 vanes. Rotation of the adjustable stator vanes 12 is desirable due to increased efficiency and performance of the aircraft engine. Specifically, the adjustable stator vanes 12 may be rotated to optimal angles corresponding to different operating conditions of the aircraft engine. For example, improvements in specific fuel consumption are seen by adjusting the vanes based on certain operating conditions. Segments of the guide vanes 12 are typically rotated concurrently by a linkage mechanism or the like that includes a crank arm or other mechanical structure operatively coupled to the guide vanes 12. It is to be appreciated that all or only some of the total number of vanes within a stage may be rotatable. For example, in some embodiments, only half of the total vanes are rotatable. In such an embodiment, every other vane may be rotated. As one can understand, any fraction of the total number of vanes may be rotated and the spacing between the vanes that are adjustable may vary. Numerous contemplated combinations may be suitable for different embodiments.

The adjustable stator vanes 12 are disposed within a first interior volume 14 having a harsh operating environment (also referred to herein as a first environment) where a hot gas passes over them in an effort to convert the thermal energy of the hot gas to mechanical work for propulsion of the aircraft. The first interior volume 14 is defined by a first structure 16, such as a turbine casing, and the first environment has a first temperature and a first pressure. The precise temperature and pressure will vary depending upon the type of aircraft engine and the operating conditions, but reference to the first temperature and the first pressure will be appreciated based on their values relative to other environments of other volumes discussed herein. Disposed radially outwardly of the first structure 16 is a second structure 18, such as an inner casing. An inner surface of the second structure 18 and an outer surface of the first structure 16 define a second interior volume 20. The second interior volume 20 has a second environment therein, with the second environment having a second temperature and a second pressure. The precise temperature and pressure of the second environment will vary depending upon the type of aircraft engine and the operating conditions, but irrespective of those variables, the second temperature and the second pressure are lower than the first temperature and the first pressure, respectively. Disposed radially outwardly of the second structure 18 is a third structure 22, such as an outer casing. An inner surface of the third structure 22 and an outer surface of the second structure 18 define a third interior volume 24. The third interior volume 24 has a third environment therein, with the third environment having a third temperature and a third pressure. The precise temperature and pressure of the third environment will vary depending upon the type of aircraft engine and the operating conditions, but irrespective of those variables, the third temperature and the third pressure are lower than the second temperature and the second pressure, respectively. An ambient environment 23 is located radially outwardly of the third structure 22. The ambient environment 23 has an ambient temperature and an ambient pressure that are lower than the third temperature and the third pressure, respectively. It is to be understood that more or less structures, and therefore volumes with different environments, may be present. The embodiments described herein benefit multi-layer structures with different environments, as will be appreciated from the description below.

Although the structures, volumes and environments described above and illustrated are in the context of an aircraft engine, it is to be appreciated that any structure requiring separation of multiple volumes that are subjected to distinct environments will benefit from the embodiments described herein.

Figure 2:
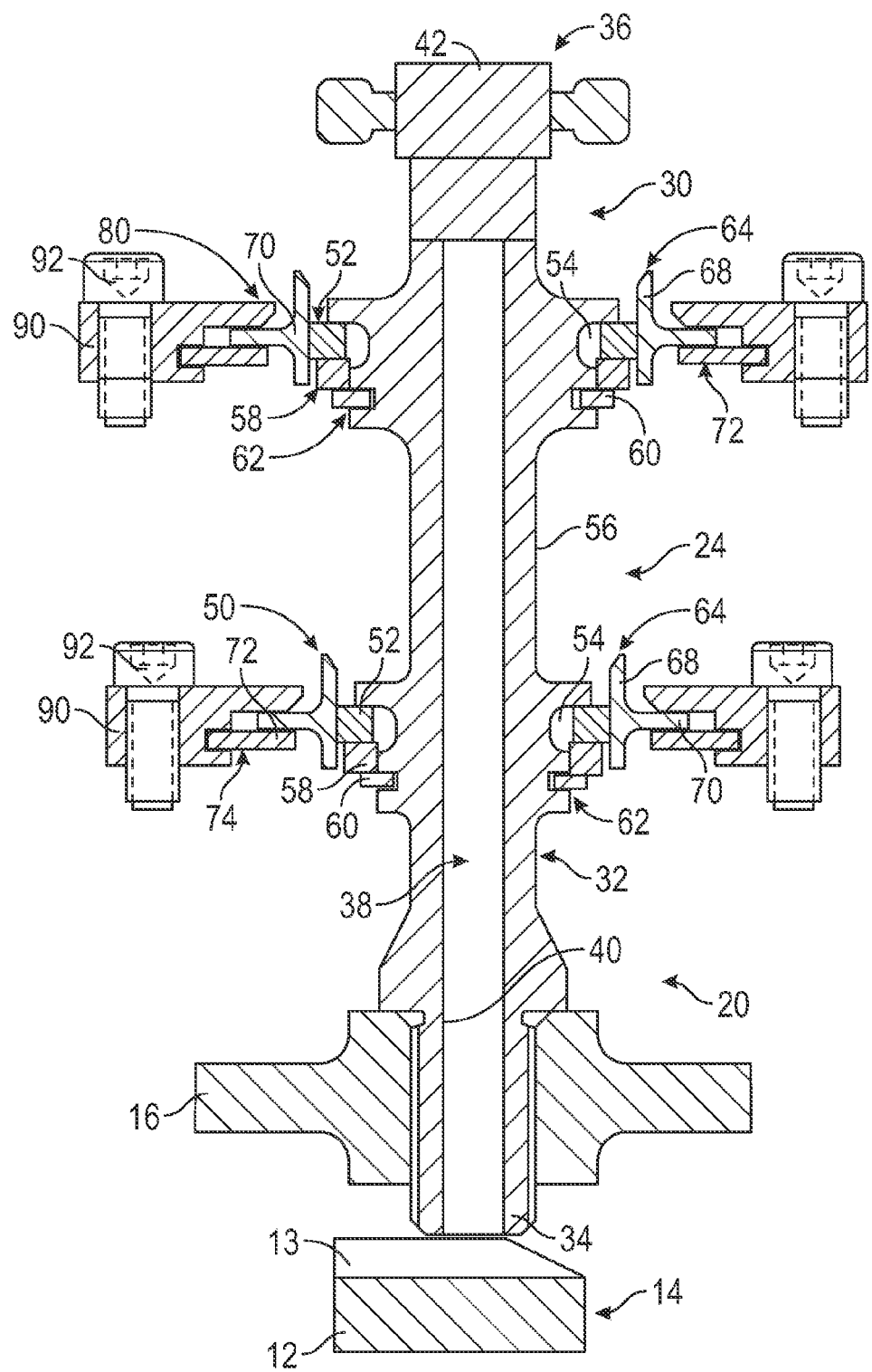
FIG. 2 is a simplified partial cross-sectional view of a sensor assembly extending through the plurality of structures of the turbine section.

Referring now to FIG. 2, with continued reference to FIG. 1, a sensor assembly 30 configured to penetrate multiple structures is illustrated in detail. The sensor assembly 30 may be used in conjunction with any structure or assembly that has a plurality (i.e., two or more) of structures that define multiple distinct environments. The sensor assembly 30 is operatively coupled to each of the plurality of structures and includes features that accommodate relative movement between the plurality of structures that occurs due to the distinct operating environments.

In the illustrated exemplary embodiment of FIG. 1, the sensor assembly 30 penetrates structures of the turbine section 10 and is subjected to the distinct environments that are defined by those structures. In particular, the sensor assembly 30 includes a sensor body 32 that penetrates through apertures of at least two structures, such as a first aperture of the first structure 16, a second aperture of the second structure 18 and a third aperture of the third structure 22. It is to be appreciated that the sensor body 32 may penetrate only two structures and may penetrate more than the three illustrated structures as well, depending upon the particular structure or assembly that the sensor assembly 30 is employed with. The sensor body 32 extends from a first end 34 to a second end 36. The first end 34 is disposed radially inwardly proximate the first structure 16 and is operatively coupled thereto. Coupling of the first end 34 of the sensor body 32 to the first structure 16 may be facilitated in any known securing process, such as welding, mechanical fasteners or threaded connection. The first end 34 may protrude slightly into the first interior volume 14, such that it is exposed to the first environment.

A sensor is located proximate the second end 36 and is routed along an interior cavity 38 of the sensor body 32 that is defined by an interior wall 40 of the sensor body 32. The interior cavity 38 may be formed of any suitable geometry, such as cylindrical, for example. The interior cavity 38 provides a protected path for the sensor and its associated sensor instrumentation (not shown) to be routed from the first end 34, where sensing detection is made, to the second end 36 of the sensor body 32, where the sensor 42 is operatively coupled. The sensor 42 may be coupled to the sensor body 32 proximate the second end 36 in any suitable manner. The second end 36 is disposed outside of the first interior volume 14. In the exemplary embodiment, the second end 36 of the sensor body 32, and therefore the sensor 42, is located in the ambient environment 23 radially outwardly of the third structure 22, but placement of the sensor 42 in one of the more benign environments (e.g., second interior volume 20 or third interior volume 24) is contemplated. Placing the sensor 42 in a location outside of the harsh environment of the first interior volume 14, and possibly outside of the second and third interior volumes 20, 24, allows for a wider selection of sensors. Wider selection is available based on certain sensors having sensitive limitations on the operating environments in which they may be disposed.

The sensor 42 is connected to the sensor instrumentation that is housed within a less harsh environment. The sensor 42 and sensor instrumentation is configured to detect at least one characteristic of a target, such as the adjustable vanes 12 disposed within the first interior volume 14. The terms target and adjustable stator vanes 12 may be used interchangeably herein as the target and the vane may be a, single integrally formed structure or may be distinct components that are operatively coupled to each other in a fixed manner, such that rotation of the vane imparts corresponding rotation of the target. "At least one characteristic" refers to any characteristic that is commonly measured by sensors. For example, position of the target, temperature of the target and pressure proximate the target are all examples of characteristics that may be detected by the sensor 42. In an exemplary embodiment, the sensor 42 is configured to detect an angular position of the vane via signals generated from the target 13 located proximate the first end 34 of the sensor body 32.

Remotely locating the sensor 42 in a less harsh environment, such as the ambient environment 23, ensures accurate and reliable operation of the sensor 42, thereby providing more accurate measurements. However, relative movement of the plurality of structures that the sensor assembly 30 penetrates and is operatively coupled to leads to potential detrimental effects related to accuracy and reliability of the measurements. The relative movement is attributed to effects of the distinct operating environments, such as different thermal growth rates of the structures. The relative movement of the structures, 16, 18, 22, may be in the radial, axial and/or circumferential direction.

To accommodate the relative movement of the structures, one or more sealing assemblies are provided to operatively couple the sensor body 32 to respective structure(s). The number of sealing assemblies will depend upon the number of structures to which the sensor body 32 is to penetrate and to be operatively coupled to. In the illustrated embodiment, operative coupling of the sensor body 32 to the first structure 16 is made by a mechanical process, such as a threaded connection, as described in detail above. The sensor body 32 is operatively coupled to the second structure 18 with a first sealing assembly 50.

The first sealing assembly 50 includes a radial seal 52 that is disposed in a groove 54 of the sensor body 32. The groove 54 extends circumferentially around an outer surface 56 of the sensor body 32 in a radial location proximate that is at the radial location of the second structure 18. The groove 54 extends completely around the sensor body 32. The radial seal 52 is configured to be at least partially disposed within the groove 54 and is in abutment with a radial seal backer 58 that is sandwiched between the radial seal 52 and a radial seal retainer 60. The radial seal retainer 60 is disposed in a notch 62 of the sensor body 32. As with the radial seal 52, the radial seal backer 58 and the radial seal retainer 60 each extend completely around the sensor body 32. The abutment of the radial seal retainer 60 and the radial seal backer 58, in combination with the abutment of the radial seal backer 58 and the radial seal 52, biases the radial seal 52 to fix the radial seal 52 in a radial direction. The radial seal retainer 60 is typically a substantially rigid structure, such that stiff support of the radial seal 52 is achieved. The radial seal 52 is at least partially flexible in order to accommodate relative movement of the structures in a radial direction, thereby allowing the sensor body 32 to move slightly in the radial direction, while maintaining a sealed arrangement.

The first sealing assembly 50 also includes a slider plate 64. The slider plate 64 is a single, integrally formed structure that includes a cylindrical portion 68 and a ring portion 70. The cylindrical portion 68 extends circumferentially around the sensor body 32 and, more particularly, around the radial seal 52. The cylindrical portion 68 is in abutment with the radial seal 52 to fix the radial seal 52 in axial and circumferential directions. The ring portion 70 is oriented substantially perpendicularly to the cylindrical portion 68 and is disposed in contact with a radially inner surface of a mounting body 90 that is coupled to the second structure 18. As shown in the illustrated embodiment, the mounting body 90 may be a ring-like structure that directly mounts to the second structure 18 via mechanical fasteners 92, however, alternative geometries and coupling processes may be employed. The mounting body 90 may be a single ring that extends circumferentially around the entire sensor body 32 or may be segmented. A slider plate retainer 72 is disposed within a recess 74 of the mounting body 90 and is in abutment with the slider plate 64 to fix the slider plate in a radial direction. The slider plate retainer 72 is typically a substantially rigid structure, such that stiff support of the slider plate 64 is achieved. The slider plate 64 is at least partially flexible in order to accommodate relative movement of the structures in both the circumferential and axial directions, thereby allowing the sensor body 32 to move slightly in these directions, while maintaining a sealed arrangement.

As described in detail above, additional structures, such as the third structure 22 may require penetration and operative coupling by the sensor assembly 30. In such embodiments, additional sealing assemblies identical to that described above in conjunction with the first sealing assembly 50 are employed. For example, a second sealing assembly 80 is illustrated. The second sealing assembly 80 includes identical sealing components to accommodate relative movement of the first, second and third structures 16, 18, 22. Such components are illustrated and labeled with corresponding numerals associated with the sealing components of the first sealing assembly 50. For purposes of description, additional sealing structures are not described or illustrated, but it is to be appreciated that additional sealing assemblies may be included to couple to additional structures.

Advantageously, the embodiments described herein allow for penetration through multiple temperature and pressure environments in order to monitor signals deep within a harsh operating environment, such as a hot gas path of a turbine engine. The embodiments also facilitate sensors to be utilized in a line replaceable unit (LRU) configuration to improve reliability and accuracy of signals from within the engine. Other benefits include the provision of greater selection of the sensing technology that is best suited to meet performance requirements.

Figure 3:
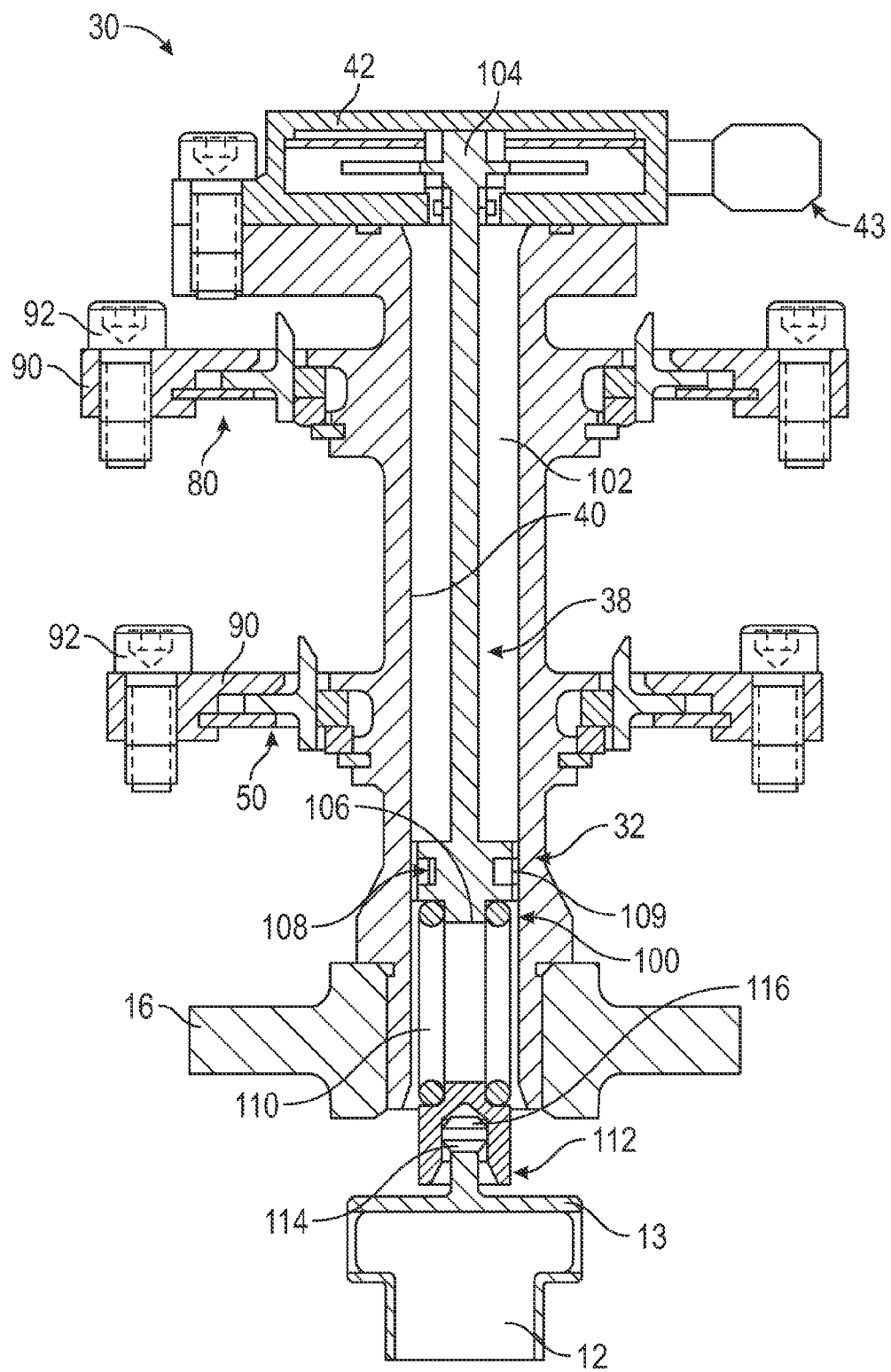
FIG. 3 is a partial cross-sectional view of the sensor assembly having a sensor linkage assembly located within an interior cavity of a sensor body of the sensor assembly.
Figure 4:
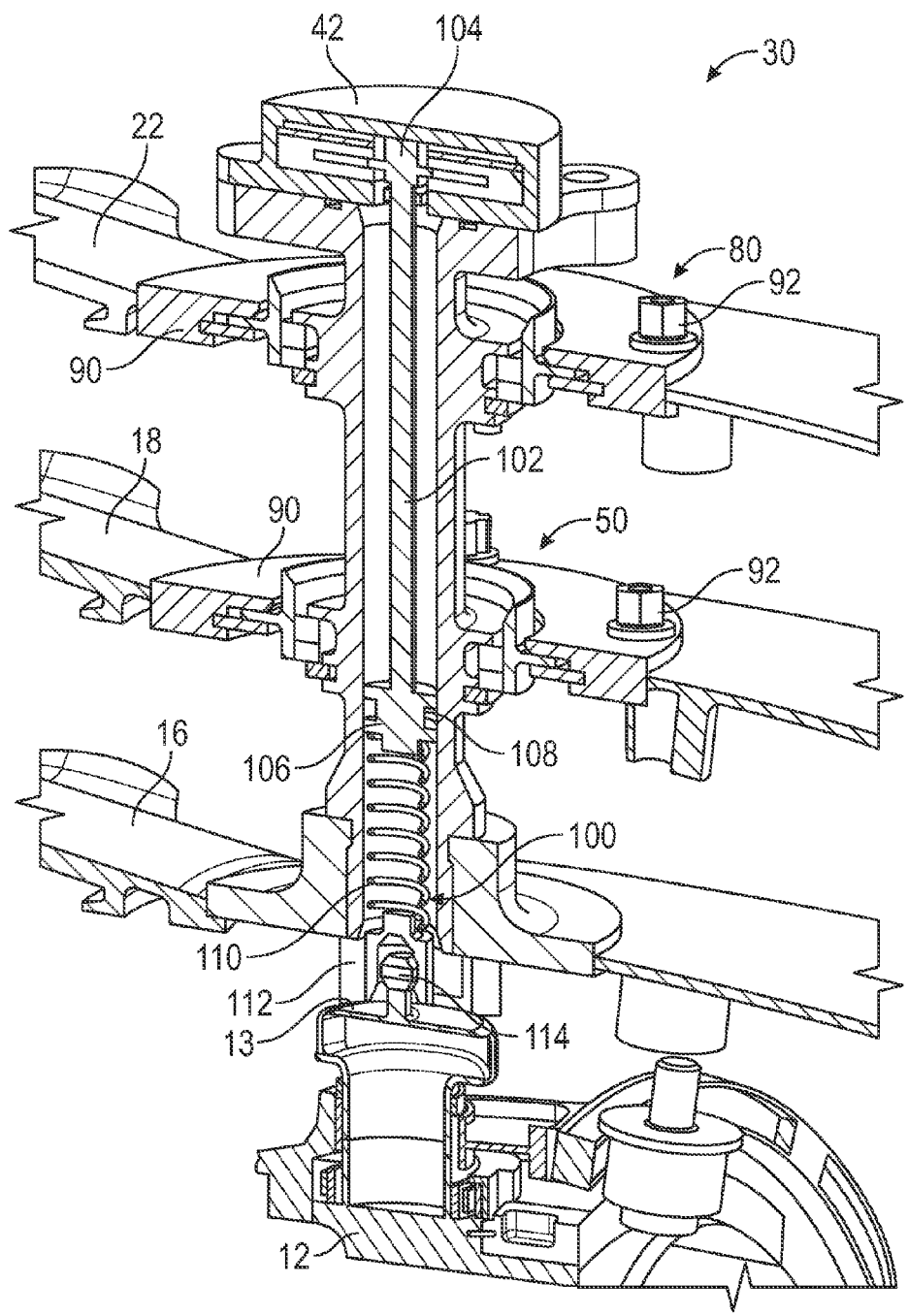
FIG. 4 is a perspective, cross-sectional view of the sensor assembly.

Referring now to FIGS. 3 and 4, the sensor assembly 30 is illustrated in greater detail. In particular, the generically illustrated sensor 42 of FIGS. 1 and 2 is illustrated in detail, as is a sensor linkage assembly 100 that extends through the interior cavity 38 of the sensor body 32. The sensor 42 is a rotary sensor having a connector 43 that may be connected to a device configured to receive, process, and/or transmit data obtained by the sensor 42.

The sensor linkage assembly 100 includes a shaft 102 that extends substantially in a longitudinal direction of the interior cavity 38 from a first end 104 of the shaft 102 to a second end 106 of the shaft 102. The shaft 102 is operatively coupled to the sensor 42 proximate the first end 104. The shaft 102 is a substantially rigid structure that is configured to control the distance between the sensor 42 and the target, i.e., adjustable stator vanes 12. A groove 108 is defined by the shaft 102 proximate the second end 106 thereof and is configured to retain a wavy expander, 109 therein for vibration dampening.

Coupled to the second end 106 of the shaft 102 is a flexible coupling 110. In the illustrated embodiment, the flexible coupling 110 is a coil spring, but it is to be appreciated that other mechanical couplings may be employed, such as a universal joint or a flexible cable, for example. The flexible coupling 110 may be coupled to the shaft 102 in any suitable manner, such as welding. At the other end of the flexible coupling 110, a coupled connection is made with a socket 112. As is the case with coupling of the flexible coupling 110 to the shaft 102, coupling between the flexible coupling 110 and the socket 112 may be made in any suitable manner. In an exemplary embodiment, the flexible coupling 110 is welded to the socket 112. Irrespective of the precise coupling techniques, the shaft 102, the flexible coupling 110 and the socket 112 form a single, structure configured to operatively couple the adjustable stator vanes 12 to the sensor 42. More particularly, rotation of the adjustable stator vanes 12 imparts corresponding rotation of the sensor linkage assembly 100 in order to obtain signals related to the adjustable position of the adjustable stator vanes 12.

Connection of the socket 112 to the target 12 is made by engaging an engagement portion 114 of the target to the socket 112. In one embodiment, the engagement portion 114 is a hex key that fits within a socket head 116 of the socket 112, with the socket head 116 having a corresponding geometry to angularly fix the engagement portion 114 relative to the socket 112. In an embodiment, the engagement portion 114 is a rounded structure, which may be referred to as a ball end hex key. The rounded geometry allows for eccentric relative movement between the adjustable stator vane 12 and the sensor linkage assembly 100. It is to be appreciated that the hex key geometry and the rounded structure are merely illustrative and numerous alternative geometries may be employed. Irrespective of the precise geometries, the socket 112 and the flexible coupling 110 accommodate thermal growth between the first structure 16 and the adjustable stator vane 12 attributed to excessive operating temperatures in the first interior volume 14.

The socket 112 may be tapered to provide a centering feature (not illustrated) to assist in the blind assembly of the socket 112 and the engagement portion 114 of the target. Additionally, the socket 112 and/or the engagement portion 114 may be made of materials having thermal growth properties that reduce clearance between the interface of the socket 112 and the engagement portion 114.

Advantageously, the embodiments described herein allow for direct engagement of rotating machinery located within a hot, pressurized environment, such as that of the first interior volume 14, to provide accurate sensing and feedback for improved performance.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A sensor assembly comprising:
   a first structure defining a first interior volume having a first environment with a first temperature and a first pressure;
   a second structure disposed radially outwardly of the first structure and defining a second interior volume having a second environment with a second temperature and a second pressure each lower than the first temperature and the first pressure;
   a sensor body extending through a first aperture of the first structure and a second aperture of the second structure, the sensor body having a first end and a second end, the first end disposed within the first environment and the second end disposed in an ambient environment located radially outwardly of the second structure, wherein the ambient environment has an ambient temperature and an ambient pressure each lower than the second temperature and the second pressure;
   a first sealing assembly configured to operatively couple the sensor body to the second structure and to accommodate movement of the sensor body due to relative movement between the first structure and the second structure;
   an interior cavity defined by an interior wall of the sensor body; and
   a rotary position sensor mounted to the sensor body proximate the second end of the sensor body, the rotary position sensor configured to detect an angular position of a target disposed within the first environment, the rotary position sensor operatively coupled to the target with a sensor linkage assembly located within the interior cavity of the sensor body.

2. The sensor assembly of claim 1, wherein the sensor linkage assembly comprises:
   a shaft coupled to the sensor proximate a shaft first end and extending along a longitudinal direction of the interior cavity to a shaft second end; and
   a socket operatively coupled to the shaft proximate the shaft second end, the socket coupled and angularly fixed to an engagement portion of the target.

3. The sensor assembly of claim 2, further comprising a wavy expander ring disposed within a shaft groove proximate the shaft second end.

4. The sensor assembly of claim 2, wherein the engagement portion of the target comprises a hex key configured to be coupled to a corresponding socket head of the socket.

5. The sensor assembly of claim 2, wherein the socket is formed of a shape memory material configured to adjust to various operating temperatures within the first interior volume.

6. The sensor assembly of claim 2, wherein the sensor linkage assembly further comprises a flexible coupling operatively coupling the shaft second end to the socket.

7. The sensor assembly of claim 6, wherein the flexible coupling comprises a spring.

8. The sensor assembly of claim 6, wherein the flexible coupling comprises one of a universal joint, a flexible cable, and a mechanical coupling.

9. The sensor assembly of claim 6, wherein the flexible coupling is welded to the shaft and to the socket.

10. The sensor assembly of claim 1, wherein the first sealing assembly comprises:
    a mounting body coupled to the second structure;
    a radial seal disposed in a groove of the sensor body;
    a slider plate having a cylindrical portion and a ring portion, the cylindrical portion and the ring portion disposed substantially orthogonal to each other, the cylindrical portion disposed in abutment with the radial seal; and
    a slider plate retainer disposed in a recess of the mounting body and in abutment with the ring portion of the slider plate to fix the slider plate.

11. The sensor assembly of claim 1, further comprising:
    a third structure disposed radially outwardly of the second structure and defining a third interior volume having a third environment with a third temperature and a third pressure each lower than the second temperature and the second pressure, wherein the ambient environment is disposed radially outwardly of the third structure; and
    a second sealing assembly configured to operatively couple the sensor body to the third structure and to accommodate movement of the sensor body due to relative movement between the first structure, the second structure and the third structure, the second sealing assembly comprising:
- a mounting body coupled to the third structure;
- a radial seal disposed in a groove of the sensor body;
- a slider plate having a cylindrical portion and a ring portion, the cylindrical portion and the ring portion disposed substantially orthogonal to each other, the cylindrical portion disposed in abutment with the radial seal; and
- a slider plate retainer disposed in a recess of the mounting body and in abutment with the ring portion of the slider plate to fix the slider plate.

12. The sensor assembly of claim 11, wherein the sensor assembly is disposed in a turbine section of an aircraft engine.

13. The sensor assembly of claim 11, wherein the target is an adjustable stator vane of the turbine section.

14. The sensor assembly of claim 12, wherein the first structure comprises a turbine casing, the second structure comprises an inner casing and the third structure comprises an outer casing.

15. A method of detecting angular position of a target through multiple structures separating multiple distinct environments, the method comprising:
- penetrating a plurality of structures with a sensor body, a first end of the sensor body being disposed within a first interior volume having a first environment with a first temperature and a first pressure, a second end of the sensor body being disposed in an ambient environment having an ambient temperature and an ambient pressure each lower than the first temperature and the first pressure, the second end having a sensor mounted thereto;
- operatively coupling the sensor body to at least one of the plurality of structures with a sealing assembly that is configured to accommodate relative movement between the plurality of structures; and
- operatively coupling a sensor located proximate the first end of the sensor body to the target located within the first interior volume with a sensor linkage assembly extending through an interior cavity of the sensor body.

* * * * *